United States Patent Office 2,760,888
Patented Aug. 28, 1956

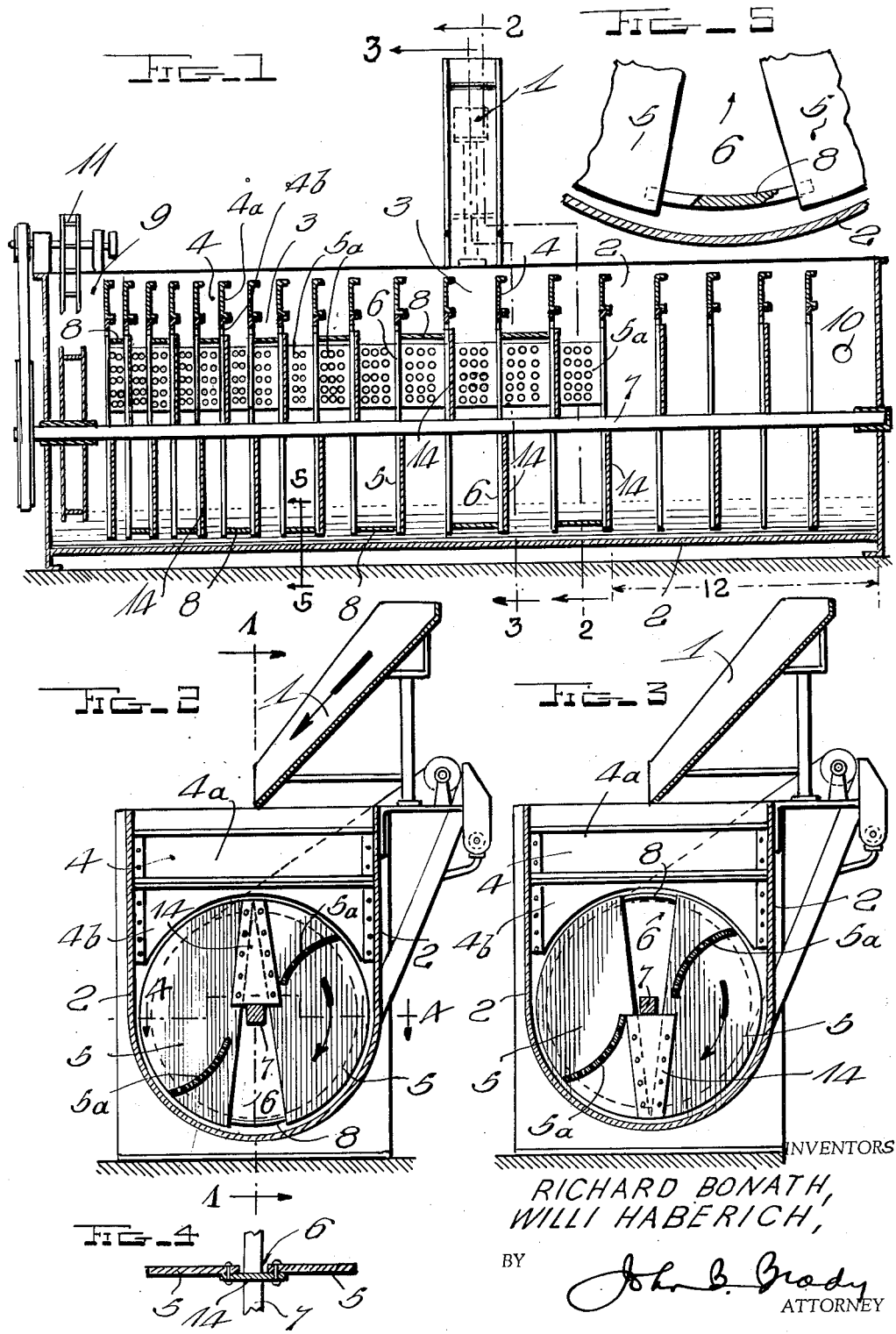

2,760,888

APPARATUS FOR THE DEFECATION OF SUGAR AND THE SLAKING OF LIME

Richard Bonath and Willi Haberich, Braunschweig, Germany, assignors to Braunschweigische Maschinenbauanstalt A. G., Braunschweig, Germany, a corporation of Germany Application November 1, 1952, Serial No. 318,264

Claims priority, application Germany November 2, 1951

3 Claims. (Cl. 127—14)

This invention relates to a process of and apparatus for the slaking of lime in water or in sugar liquor.

In the principal stage in the defecation of sugar liquors or in the production of milk of lime, it has been the practice heretofore to bring the lime into contact with the slaking liquid, whether water or sugar liquor, within a mixing-drum or similar apparatus, in which the lime is then slaked, both lime and liquor being conveyed in the same direction. In this practice it is difficult to separate the lime grit from the liquid at the conclusion of the process and this has been made possible only by the employment of additional sieve devices.

The separation of the lime grit from the milk of lime, or, as the case may be, from the clarified liquor, is rendered difficult owing to the fact that because of the presence of lime in the moisture adhering to the grit, the mixture of grit and lime liquid drawn off solidifies under the influence of carbonic acid from the air, thus forming in some cases a firm crust which chokes the sieves.

The object of the invention is to facilitate the separation of lime-free grit from the slaking liquid and to obtain an even increase in the concentration of lime during treatment, the process being capable of control. This is achieved by passing the dry lime continuously into the liquid as it flows through a trough, whereby the lime is conveyed through said trough in counter-direction to that of the flow of liquid. The conveyor-mechanism of this trough is a familiar one employed for various other purposes. It comprises revolving discs containing an aperture at one point on their circumference, said apertures being so disposed relative to one another as to permit only a gradual movement of solid or semi-solid elements. This forward motion is supported by a conveyor-worm or similar device for the solid bodies or sediment. Stirring is effected by blades attached to and operating between the discs.

If the object is not merely the production of milk of lime but the main process of clarifying sugar liquor, known as dry defecation, the trough may be extended according to the invention by providing an additional stabilizing zone for the purpose of decanting the grit. This stabilizing zone adjoins the trough at the point where the lime is introduced and is therefore situated opposite to that end towards which the lime and grit are being conveyed. Agitator blades are unnecessary in this part. It is, however, partitioned off as is the other part, by revolving discs which, by virtue of the revolving apertures in juxtaposition, permit only gradual progress of the contents of the trough.

At the end of the trough towards which the lime is conveyed, some form of extraction device may be installed, for example an elevator-worm or simple elevator.

To assist understanding of the process, an embodiment of the apparatus pertaining thereto is illustrated in the accompanying drawing, in which:

Fig. 1 shows a longitudinal section of the apparatus;

Fig. 2 is a cross-section substantially on line 2—2 of Fig. 1;

Fig. 3 is a cross section substantially on line 3—3 of Fig. 1;

Fig. 4 is a fragmentary transverse section on line 4—4 of Fig. 2, showing the manner in which the rotor discs are associated with the drive shaft; and Fig. 5 is an enlarged fragmentary view showing the manner of connecting the peripheral portions of the slots of the discs in the rotor of our invention.

Referring to the drawing, in the carrying out of the process dry lime is introduced into the trough 2 by means of the chute 1 which rests on the upper part of the trough 2 and may be rotatable or rigid as desired. The lime falls into one of the compartments 3 partitioned off by the rigid walls 4. Each partition 4 comprises a transverse wall 4a and a coplanar wall portion 4b cut out to conform with the circular contour of the peripheral edge of disc 5. The transverse wall 4a and the coplanar wall portion 4b are each strengthened by ribs formed at an angle to the plane of the walls. Transverse wall 4a and coplanar wall portion 4b are connected at their opposite ends between the interior sides of the trough 2. Each of these partition-walls 4 is extended downwards by a revolving partition-disc 5 so that the lime, when first introduced, cannot immediately leave the compartment. A radial slot 6 is, however, provided in the surface of each disc 5, each slot 6 extending approximately to the center of the appropriate disc. The discs 5 revolve on a common shaft 7 as a result of which temporary communication is provided between adjoining compartments 3 once in each revolution of each intermediate disc. The lime is conveyed from each compartment through the slot 6 between the two parts of the disc 5. The disc 5 comprises two flat substantially semi-circular parts connected together by a flat plate 14. Plate 14 is substantially trapezoidal in contour enabling two substantially semi-circular disc parts to be oriented with respect to each other on opposite sides of shaft 7, and connected together on one side of shaft 7 while an open tapered slot remains between the parts of the disc on the other side of the shaft. The plate 14 provides means through which a welded connection may be established with the shaft 7 which is polygonal in shape as shown and where the longest of the lateral edges of the plate 14 abuts with and is welded to a lineal edge of the section of the shaft 7 into the adjoining compartment by means of agitator-blades 8 which may take the form of partial screw- or propeller-blades. At this point, however, the lime can advance no further along the trough at first because the slots 6 in the discs are so arranged relative to one another that they do not provide at any given moment two consecutive openings from compartment to compartment. The slots may be arranged, for example, alternately at 180° to each other. The flow path is accordingly directed substantially sinusoidally while agitating the material compartment by compartment at each loop in the substantially sinusoidal flow-path. By the use of such a device, which is commonly employed for example in mashing- and cooking-apparatus, the lime is conveyed in counter-flow relative to the liquid which is introduced into the trough near one end at 9 and leaves the trough at the other end at 10. By this arrangement there is a controlled gradation of the concentration of lime and in addition the insoluble residue of the lime is conveyed to the left-hand end of the trough 2 (see Fig. 1) where the grit can be removed simply in a continuous process by a mechanical conveyor device, for example an elevator 11.

The partition-discs carry perforated agitator vanes 5a to stir the lime.

The embodiment illustrated relates to a device for the principal stage in the dry defecation of sugar-liquor. Thus, in Fig. 1 (right-hand end) a stabilizing zone 12 is provided which is partitioned in exactly the same way as the left-hand section of the trough but no agitator-blades are fitted. Only the finest particles of grit penetrate as far as the stabilizing zone 12. These are carried by the liquid towards the outlet-point for clarified liquor and are then intended to decant in this area. The partition-discs and agitator-vanes ensure here that the grit settles compartment by compartment.

The compartments 3 increase in width from the left-hand end to the stabilizing zone 12 at the right-hand end of the apparatus.

Should a similar device be required for the slaking of lime in water, that is for the production of milk of lime, the provision of the additional stabilizing zone 12 is no longer necessary.

While we have described our invention in one of its preferred embodiments we realize that modifications may be made and we desire that it be understood that no limitations upon our invention are intended other than may be imposed by the scope of the appended claims.

We claim:

1. Apparatus for the defecation of sugar liquor comprising a trough-like receptacle, inlet means for sugar liquor adjacent one end of the receptacle, outlet means for the slaked liquor at the opposite end of the receptacle, a plurality of partition elements extending transversely across the upper end of the receptacle and spaced apart longitudinally of the receptacle in progressively increasing spatial relation, a shaft extending longitudinally of the receptacle and mounted therein below said partition elements and adapted to be driven, a plurality of disc elements mounted on said shaft in longitudinally-spaced relationship below said partition elements and co-operating therewith to divide the receptacle into a plurality of compartments of progressively increasing widths, each of said discs having a through opening extending substantially radially of the shaft and staggered in the circumferential direction relative to the through opening of each adjacent disc to provide a substantially sinusoidal longitudinally extending flow-path, means for introducing dry lime into at least one of the compartments intermediate the inlet means and outlet means, curved vane means on each disc adapted to thrust the lime towards the disc thereadjacent between it and the end of the receptacle adjacent the inlet means and force the lime through the opening in the latter disc when the opening extends towards the bottom of the trough, thus causing the lime to travel in increments counter to the flow of liquor and at a speed dependent on the speed of rotation of the shaft, agitator blades on each disc at and forward of the lime entry region to agitate the lime as the discs rotate, and means for removing the insoluble residue of the lime after it has passed the inlet means.

2. Apparatus for the slaking of lime in water comprising a trough-like receptacle, liquid inlet means for slaking liquid adjacent one end of the receptacle, outlet means for the slaked product at the opposite end of the receptacle, a multiplicity of partitions extending transversely between opposite sides of the receptacle adjacent the top thereof and spaced apart longitudinally of the receptacle, a shaft extending longitudinally of the receptacle in a position spaced below said partitions, and adapted to be driven, a plurality of disc elements mounted in spaced relation on said shaft and extending in positions coplanar with said partitions for dividing the receptacle into a plurality of compartments each having a through opening closed by said disc elements, agitator means associated with certain of said disc elements, means for feeding dry lime into at least one of said compartments remote from the liquid inlet means and means carried by certain of said disc elements in certain of said compartments for forcing the lime through the through openings of the said compartments, and a group of disc elements adjacent said outlet means and forming a stabilizing zone in said receptacle intermediate the last of said disc elements associated with said agitator means and said outlet means.

3. Apparatus for the slaking of lime as set forth in claim 2 in which said compartments progressively increase in width from said inlet means to the last of said compartments occupied by the discs associated with said agitator means and wherein the compartments in said stabilizing zone are substantially of uniform width and are free of said agitator means.

References Cited in the file of this patent

UNITED STATES PATENTS

| | | |
|---|---|---|
| 1,865,615 | Coleman | July 5, 1932 |
| 2,053,876 | Pfau et al. | Sept. 8, 1936 |
| 2,382,605 | Carter | Aug. 14, 1945 |
| 2,610,929 | Brieghel-Muller | Sept. 16, 1952 |